(12) United States Patent
Fan

(10) Patent No.: US 7,234,826 B2
(45) Date of Patent: Jun. 26, 2007

(54) LIQUID CRYSTAL DISPLAY DEVICE AND BACKLIGHT MODULE THEREOF

(75) Inventor: Kuo-Shu Fan, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 128 days.

(21) Appl. No.: 11/085,310

(22) Filed: Mar. 21, 2005

(65) Prior Publication Data

US 2005/0243546 A1    Nov. 3, 2005

Related U.S. Application Data

(63) Continuation-in-part of application No. 10/205,429, filed on Jul. 25, 2002, now abandoned.

(30) Foreign Application Priority Data

Jan. 29, 2002    (TW) ............... 91200925 U

(51) Int. Cl.
   *G01D 11/28* (2006.01)
(52) U.S. Cl. .............. 362/29; 362/216; 362/225
(58) Field of Classification Search ............ 362/29, 362/30, 97, 216, 223, 225, 260; 349/58, 349/70
   See application file for complete search history.

(56) References Cited

U.S. PATENT DOCUMENTS

| | | | | |
|---|---|---|---|---|
| 2,728,845 | A | * | 12/1955 | Potter .................. 362/216 |
| 4,842,378 | A | * | 6/1989 | Flasck et al. .......... 349/70 |
| 7,063,439 | B2 | * | 6/2006 | Peng et al. ............ 362/260 |
| 7,086,753 | B2 | * | 8/2006 | Lin et al. .............. 362/225 |

FOREIGN PATENT DOCUMENTS

| | | |
|---|---|---|
| JP | 07-272507 | 10/1995 |
| JP | 09-320320 | 12/1997 |

* cited by examiner

*Primary Examiner*—Y. My Quach-Lee
(74) *Attorney, Agent, or Firm*—Senniger Powers

(57) ABSTRACT

The present invention mainly relates to a liquid crystal display device which comprises a casing and a backlight module; wherein the casing comprises a frame and an opening formed at a central region of the casing, the opening defining an active area; the backlight module used in providing light source via the active area comprises at least one lamp distributed equally in regions defined by the frame and the active area. The at least one lamp comprising an even luminance portion and a dense luminance portion, wherein the even luminance portion is located in the region defined by the active area while the dense luminance portion is located in the region defined by the frame. Because the dense luminance portion is located outside the active area in the invention, the luminance uniformity in the active area is raised without complex treatments thereby.

6 Claims, 7 Drawing Sheets

LIQUID CRYSTAL DISPLAY DEVICE AND BACKLIGHT MODULE THEREOF

BACKGROUND OF THE INVENTION

1. Field of the Invention

The present invention mainly relates to a liquid crystal display device, more particularly, to a backlight module used in a liquid crystal display device.

2. Description of the Related Art

Nowadays, liquid crystal display devices are applied much in personal computers, laptop computers and various kinds of communication equipment. However, liquid crystal itself does not emit light, and a backlight module must be applied to provide luminance to the liquid crystal display device. There are various kinds of backlight module used in the liquid crystal device. A direct under type backlight module usually comprises at least one linear lamp in parallel to each other disposed under a diffusing plate, and has advantages of light weight, high luminance and simple structure as compared with other kinds of backlight module.

Besides linear lamps applied in a direct under type backlight module, U-shaped lamps can also be applied (referring to Japan. Patent NO. 7-272507 and 9-320320). Referring to FIG. 1, a liquid crystal display device 1 comprises a casing 11 and the casing 11 comprising a frame 111 and an opening 112 formed at a central region of the casing 11 to define an active area 12 and show specific data of a liquid crystal panel. A backlight module comprising at least one lamp 13 to provide light source to the active area 12, wherein each lamp 13 is in a U-shape formed by two parallel straight tube parts 131 and a bent tube part 132 all disposed in the active area 12, and comprises an electrode 133 at each end.

Comparing the U-shaped lamps with the linear lamps, uses and assemblies of the electrodes can be reduced. Besides, only a circuit board for connecting the electrodes 133 is needed to be disposed at one side of the liquid crystal display device, and the cost of manufacturing is reduced thereby. On the other hand, when using the U-shaped lamps 13, luminance of the bent tube part 132 nearby is much brighter than that of other regions to be uneven. In order to resolve the problem, a specially treated diffusing plate (not shown) is disposed above the lamps 13. Such treatment comprises printing or coating with specific materials in regions above the bent tube part 132 of the diffusing plate to make luminance of the bent tube part 132 nearby be the same as that of other parts after diffused by the diffusing plate. Such treatment is more difficult and the diffusing plate is damaged if unsuitable manipulated, and the cost of manufacturing rises also.

Therefore, the present invention is engaged in developing a novel and improved backlight module and a liquid crystal display device thereof to attain luminance uniformity and low cost.

SUMMARY OF THE INVENTION

One objective of the present invention is to provide a liquid crystal display device which comprises a casing and a backlight module; wherein the casing comprises a frame and an opening formed at a central region of the casing, the opening defining an active area; the backlight module used in providing light source via the active area comprises at least one lamp distributed equally in regions defined by the frame and the active area. The at least one lamp comprising an even luminance portion and a dense luminance portion, wherein the even luminance portion is located in the region defined by the active area while the dense luminance portion is located in the region defined by the frame. Because the dense luminance portion is located outside the active area in the invention, the luminance uniformity in the active area is raised without complex treatments thereby.

The other objective of the present invention is to provide a backlight module used in a liquid crystal display device, the liquid crystal display device comprising a casing; wherein the casing comprises a frame and an opening formed at a central region of the casing, the opening defining an active area; the backlight module used in providing light source via the active area comprises at least one lamp distributed equally in regions defined by the frame and the active area. The at least one lamp comprising an even luminance portion and a dense luminance portion, wherein the even luminance portion is located in the region defined by the active area while the dense luminance portion is located in the region defined by the frame.

Still another objective of the present invention is to provide a liquid crystal display device comprising a casing and a backlight module. The casing comprises a frame and an opening formed at a central region of the casing, the opening defining an active area. The backlight module is adapted to act as a light source for the liquid crystal display device. The backlight module comprises a housing and at least one lamp, wherein each lamp comprises an even luminance portion and a dense luminance portion, the even luminance portion is disposed within the active area while the dense luminance portion is disposed outside the active area. The housing has at least one cavity corresponding to each lamp; the cavity is disposed outside the active area for accommodating the dense luminance portion of the lamp. Because the dense luminance portion of the lamp is in the cavity, the heat flow of the dense luminance portion of the lamp due to air convention can be reduced. Therefore, the dense luminance portion of the lamp can maintain a stable temperature, so as to avoid rapid decrease thereof.

DETAILED DESCRIPTION OF THE INVENTION

The preferred embodiments in the invention are described below.

The First Embodiment

Figure 1:
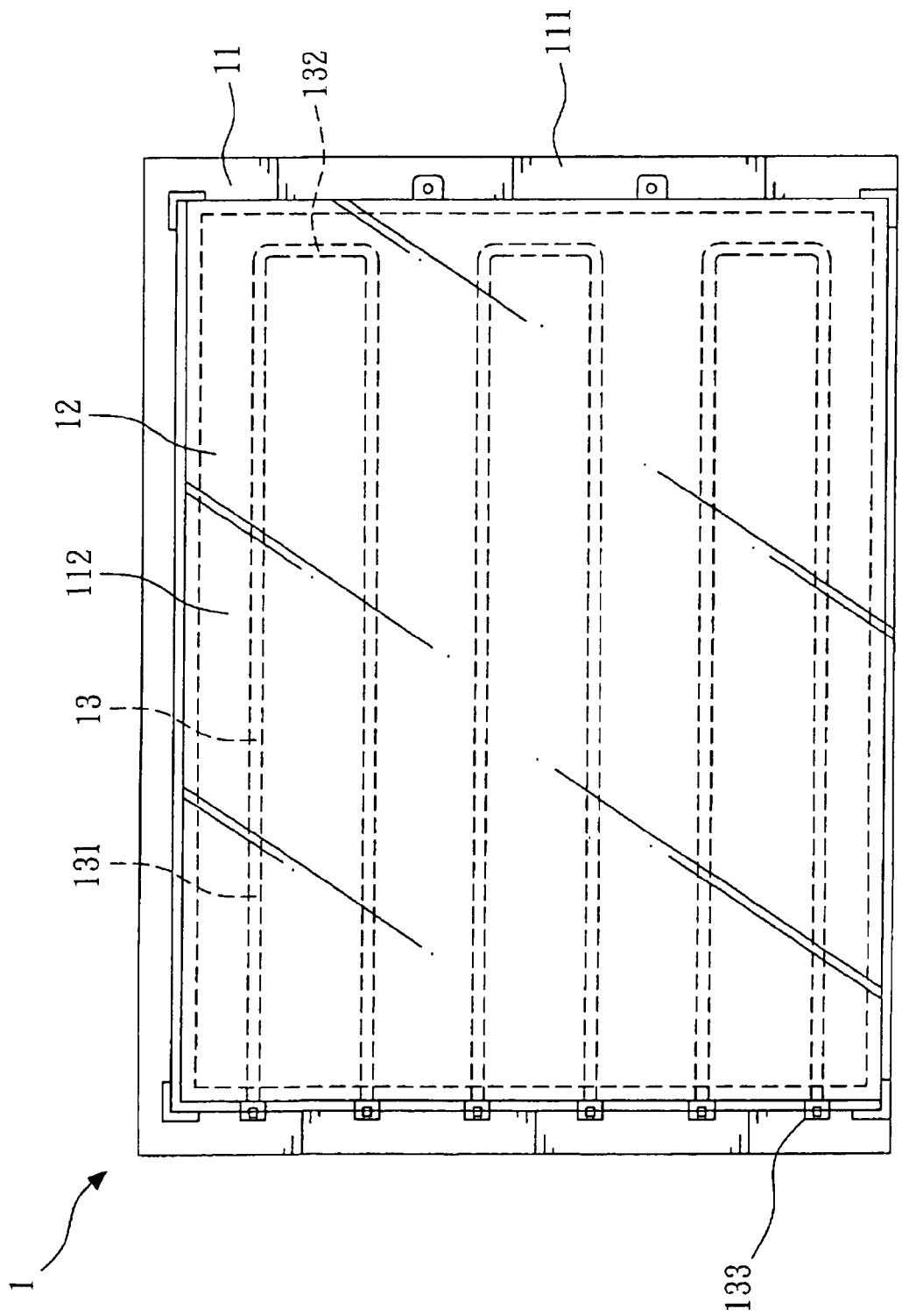
FIG. 1 illustrates a conventional casing and a direct under type backlight module of a liquid crystal display device.
Figure 2:
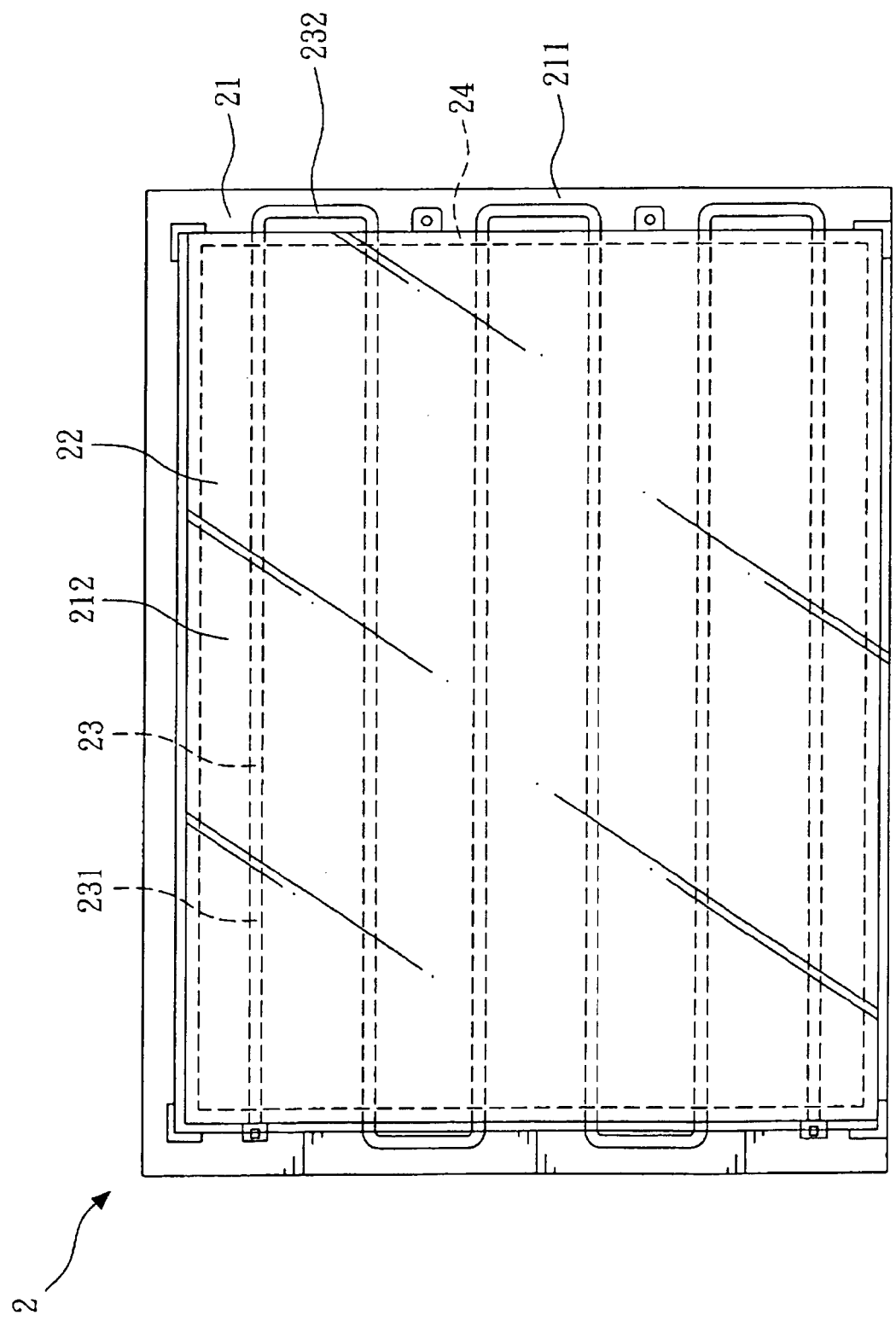
FIG. 2 illustrates a casing and a direct under type backlight module of a liquid crystal display device according to the first embodiment of the invention.

FIG. 2 illustrates a liquid crystal display device 2 comprising a casing 21 for receiving a backlight module comprising a frame 211 and an opening 212 formed at a central region of the casing 21, the opening to define an active area 22 to show specific data of a liquid crystal panel. The backlight module comprises an inner side wall 24 and at least one lamp 23. The inner side wall 24 defines an enclosure area substantially complementary to the active area 22. The lamp 23 is shaped by a serpentine tube comprising a plurality of parallel straight tube parts 231 which connect to adjacent ones by a bent tube part 232, more preferably, the straight tube parts 231 are generally paralleled to each other.

The present invention is characterized by disposing the lamps 23; wherein the straight tube part 231 forming an even luminance portion is almost located in the active area 22 while the bent tube part 232 forming a dense luminance portion is located outside of the active area 22. The bent tube part 232 is disposed in a region covered by the frame 211 and the inner side wall 24 to shelter light emitted by the bent tube part 232. Specifically, the inner side wall 24 is substantially located under the edges defining the opening 212. Preferably, the inner side wall 24 is adapted to be superimposed over the frame 211 which defines the active area 22. It follows that assembly of the inner side wall 24 and the frame 211 can enhance the effect of sheltering the light emitted by the bent tube part 232. As the reason, luminance of the active area 22 is almost emitted evenly by the straight tube parts 231 to be uniform. Therefore, a diffusing plate in the backlight module used in the present invention needs no special treatments and the costs and difficulties of manufacturing are significantly reduced.

The Second Embodiment

Figure 3:
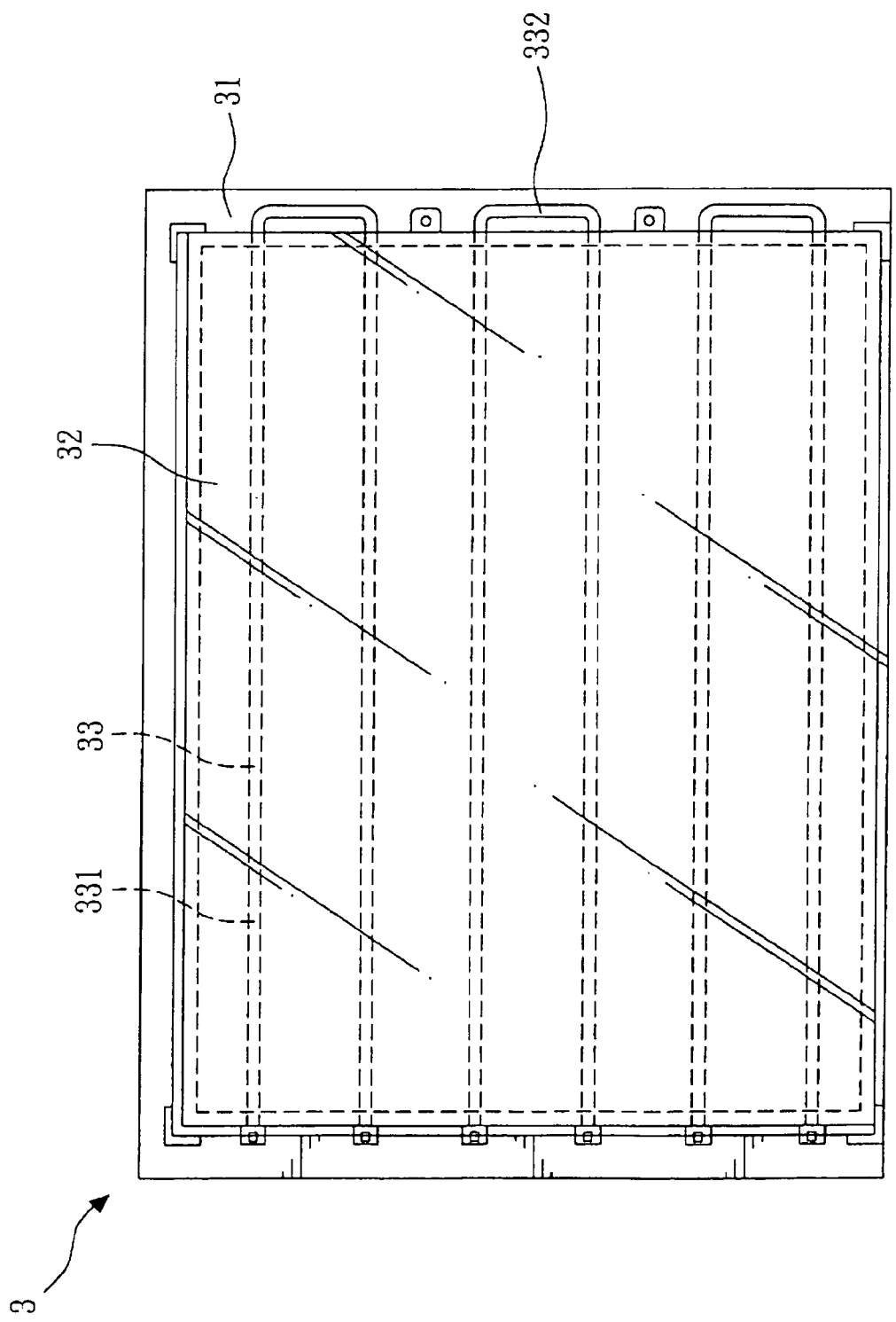
FIG. 3 illustrates a casing and a direct under type backlight module of a liquid crystal display device according to the second embodiment of the invention.

FIG. 3 illustrates a liquid crystal display device 3 similar to the liquid crystal display device 2 comprising an active area 32 defined by a casing 31 and backlight module having at least one lamp 33 to provide luminance. Each lamp 33 comprises two straight tube parts 331 almost in parallel to each other and a bent tube part 332 connecting therebetween to form a U-shape. The straight tube parts 331 are located in the active area 32 while the bent tube parts 332 are located outside of the active area 32. More preferably, the backlight module comprises three such lamps.

The Third Embodiment

Figure 4:
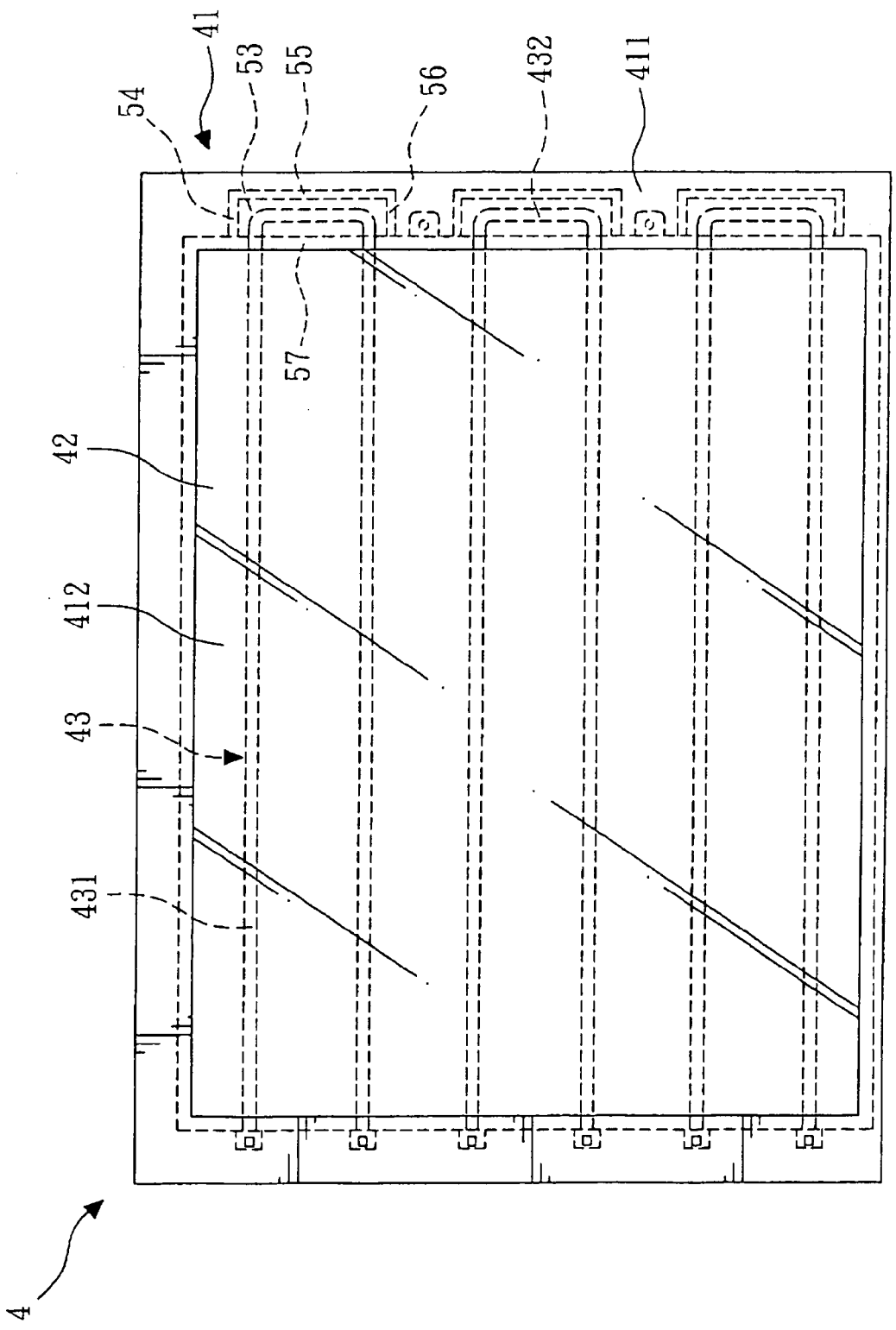
FIG. 4 illustrates a casing and a direct under type backlight module of a liquid crystal display device according to the third embodiment of the invention.
Figure 5:
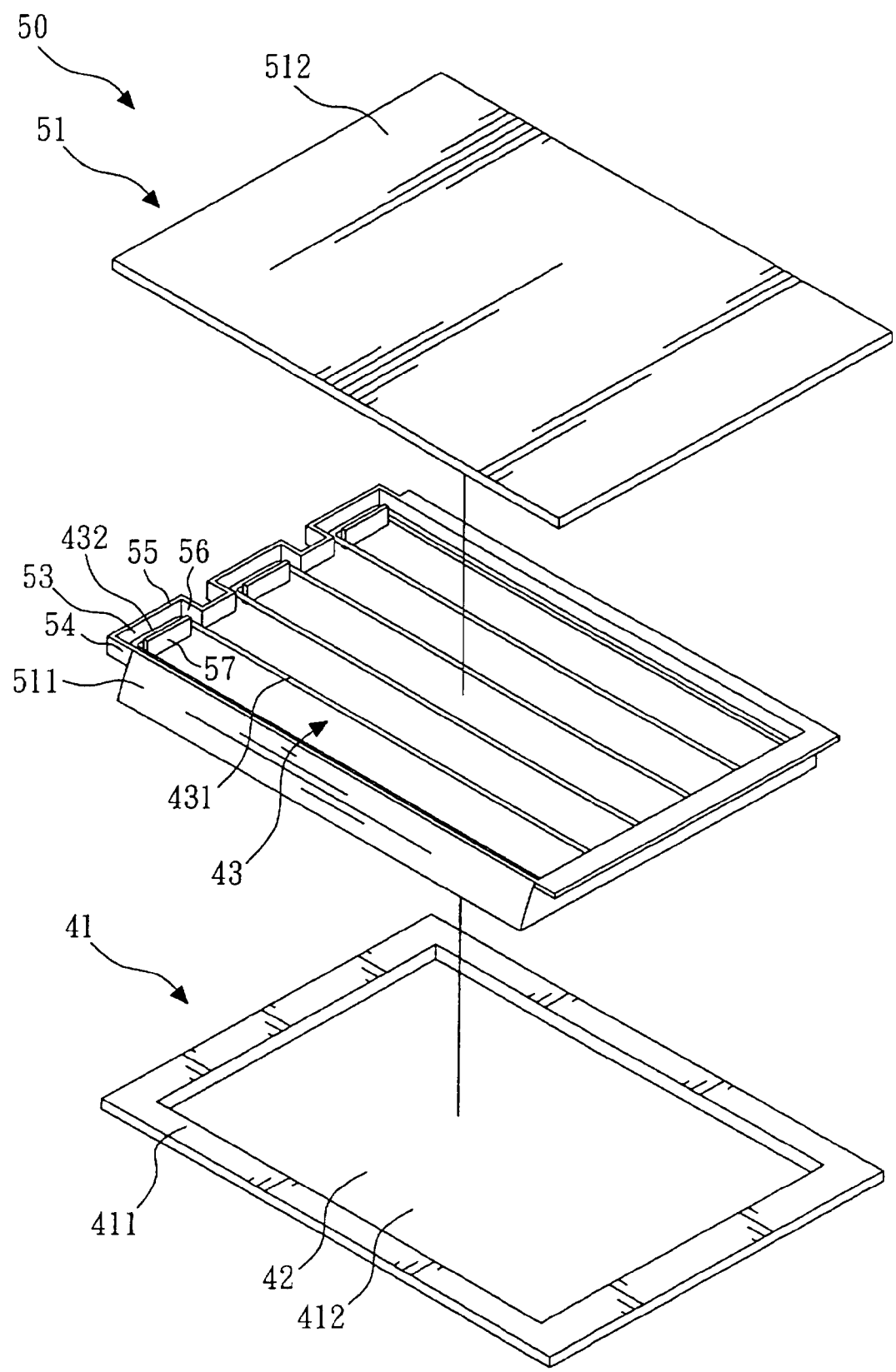
FIG. 5 illustrates a perspective partial enlarged view of FIG. 4 from it backsides.

FIGS. 4 and 5 illustrate a liquid crystal display device 4 comprising a casing 41 for receiving a backlight module 50, wherein FIG. 5 illustrates a perspective partial enlarged view of FIG. 4 from it backside. The casing 41 comprising a frame 411 and an opening 412 formed at a central region of the frame 411. The opening 412 defines an active area 42 to show specific data of a liquid crystal panel. The backlight module 50 comprises at least one lamp 43 and a housing 51. Each lamp 43 comprises two straight tube parts 431 almost in parallel to each other and a bent tube part 432 connecting therebetween to form a U-shape. The straight tube part 431 forming an even luminance portion is almost located within the active area 42 while the bent tube part 432 forming a dense luminance portion is located outside the active area 42.

The housing 51 has a front housing 511, a back housing 512, at least one cavity 53 and at least one inner side wall 57. In this embodiment, the front housing 511 has three side walls 54, 55, 56. The side walls 54, 55, 56 and the inner side wall 57 define the cavity 53 for accommodating the bent tube part 432 of the lamp 43. Alternatively, the side walls 54, 55, 56 may be disposed on the back housing 512 for defining the cavity 53. The back housing 512 is attached to the front housing 511 and is used for reflecting the light from the lamp 43.

Figure 6:
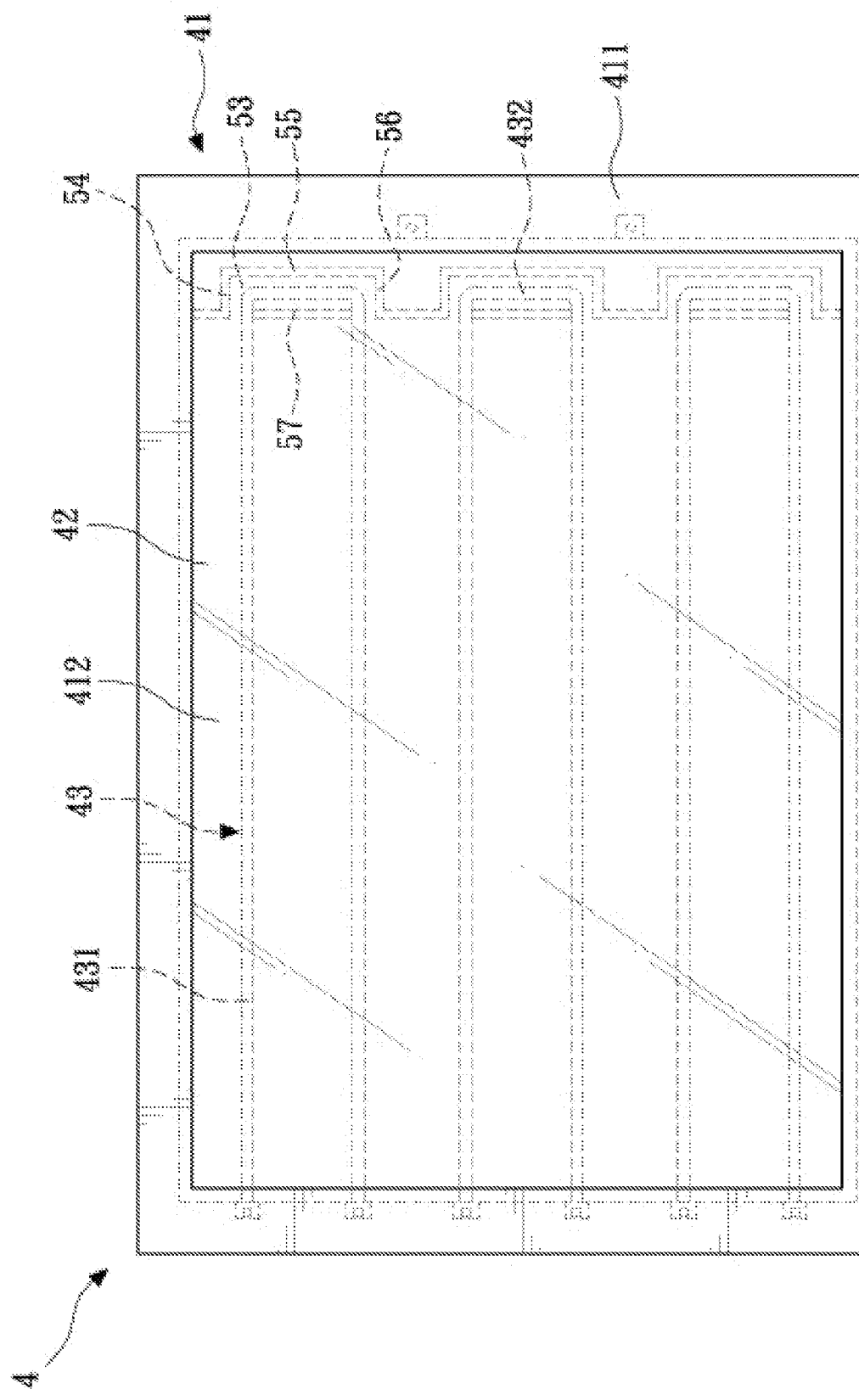
FIG. 6 illustrates a casing and a direct under type backlight module of a liquid crystal display device according to an example of the third embodiment of the invention.

In this embodiment, the bent tube part 432 of the lamp 43 and the cavity 53 are disposed outside the active area 42. Alternatively, the bent tube part 432 of the lamp 43 and the cavity 53 may be disposed inside the active area 42, as shown in FIG. 6. Because the bent tube part 432 of the lamp 43 is disposed inside the cavity 53, the heat flow of the bent tube part 432 of the lamp 43 due to air convection can be reduced. Therefore, the bent tube part 432 of the lamp 43 can maintain a stable temperature, so as to avoid the condensation of the mercury in the lamp 43 when operating in the cold temperature of the environment.

Figure 7:
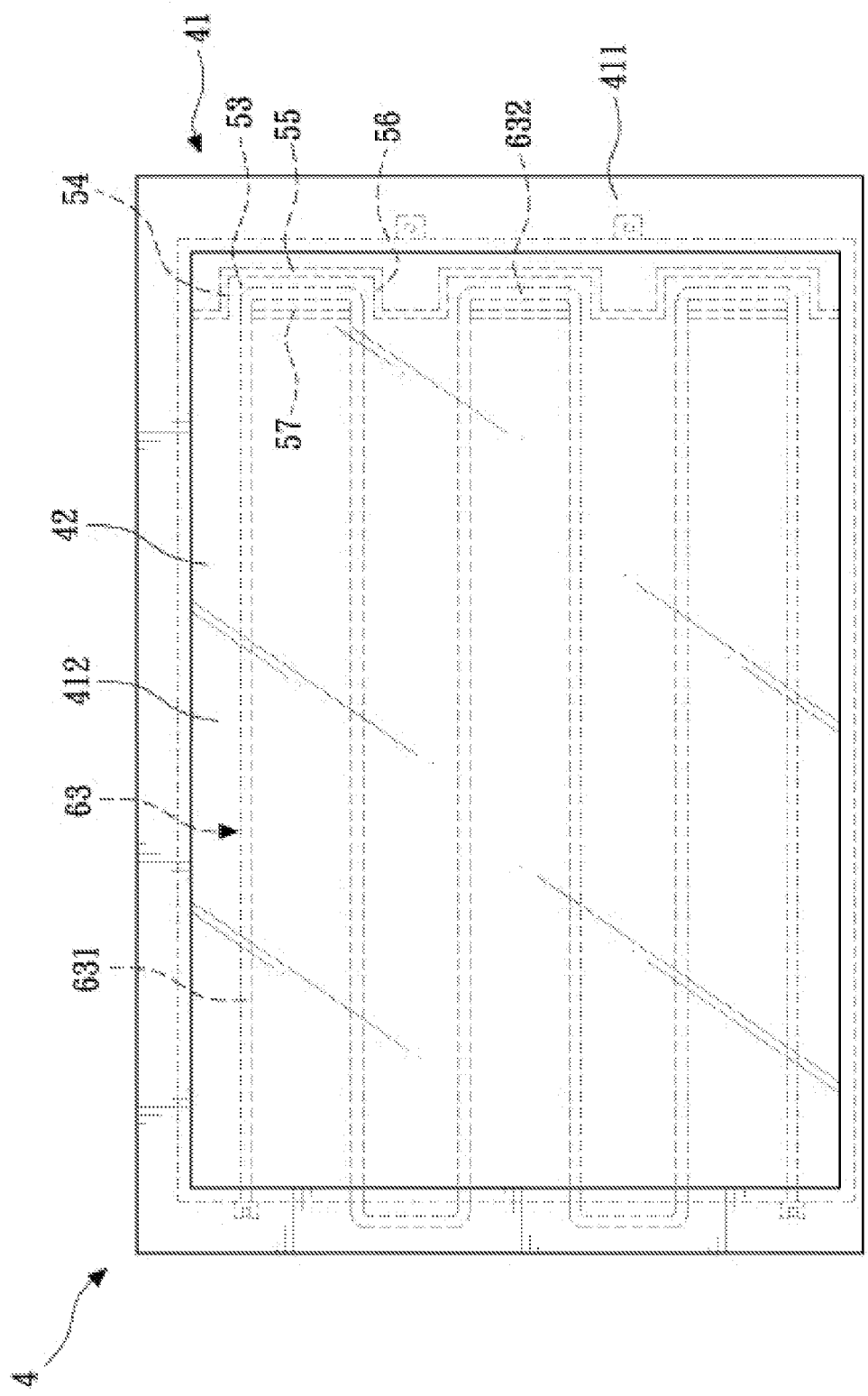
FIG. 7 illustrates a casing and a direct under type backlight module of a liquid crystal display device according to another example of the third embodiment of the invention.

Alternatively, as shown in FIG. 7, the lamp 63 is shaped by a serpentine tube comprising a plurality of parallel straight tube parts 631 which connect to adjacent ones by a bent tube part 632, more preferably, the straight tube parts 631 are generally paralleled to each other. The straight tube part 631 forming an even luminance portion and the bent tube part 632 forming a dense luminance portion are all located inside the active area 42.

The liquid crystal display device of the present invention can be in any sizes, and luminance can be adjusted by changing positions, density and length of the lamp. The size and number of the lamps are not limited in the disclosure in the embodiments mentioned above. Liquid crystal display devices and backlight modules thereof having dense luminance portions sheltered by the frames are in the scope of the present invention.

As embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A liquid crystal display device comprising:
    a casing comprising a frame and an opening formed at a central region of the casing, the opening defining an active area; and
    a backlight module adapted to provide light source for the liquid crystal display device, in which the backlight module comprises a housing and at least one lamp, wherein each lamp comprises an even luminance portion and a dense luminance portion, and the housing has at least one cavity corresponding to each lamp for accommodating the dense luminance portion of the lamp, wherein the cavity is disposed inside the active area.

2. A liquid crystal display device according to claim 1, wherein the at least one lamp is shaped by a serpentine tube, which includes a plurality of straight tube parts forming the even luminance portion and a plurality of bent tube parts forming the dense luminance portion and connecting the straight tube parts sequentially.

3. A liquid crystal display device according to claim 1, comprising a plurality of U-shaped lamps, each of the lamps comprising two straight tube parts and a bent tube part connecting therebetween, wherein the straight tube parts form the even luminance portion and the bent tube parts form the dense luminance portion.

4. A liquid crystal display device according to claim 1, wherein the housing comprises a front housing and a back housing, and the front housing has three side walls to define the cavity.

5. A liquid crystal display device according to claim 4, wherein the back housing is used for reflecting the light from the lamp.

6. A liquid crystal display device according to claim 4, wherein the backlight module further comprises at least one inner side wall to define the cavity.

* * * * *